(12) United States Patent
Kleinschnitz, Jr. et al.

(10) Patent No.: US 9,182,969 B1
(45) Date of Patent: Nov. 10, 2015

(54) USING DISASSOCIATED IMAGES FOR COMPUTER AND STORAGE RESOURCE MANAGEMENT

(75) Inventors: Donald Kleinschnitz, Jr., Sandy, UT (US); Val A. Arbon, Orem, UT (US); Roland D. Whatcott, Salem, UT (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 11/863,939

(22) Filed: Sep. 28, 2007

Related U.S. Application Data

(63) Continuation of application No. 10/406,139, filed on Apr. 2, 2003.

(60) Provisional application No. 60/370,100, filed on Apr. 3, 2002.

(51) Int. Cl.

| | |
|---|---|
| *G06F 12/00* | (2006.01) |
| *G06F 13/00* | (2006.01) |
| *G06F 13/28* | (2006.01) |
| *G06F 9/445* | (2006.01) |
| *G06F 11/14* | (2006.01) |

(52) U.S. Cl.
CPC .............. *G06F 8/63* (2013.01); *G06F 11/1417* (2013.01)

(58) Field of Classification Search
CPC . G06F 8/63; G06F 11/1417; G06F 17/30286; G06F 8/64
USPC .......................................................... 711/154
See application file for complete search history.

(56) References Cited

U.S. PATENT DOCUMENTS

| | | | |
|---|---|---|---|
| 5,325,532 | A | 6/1994 | Crosswy et al. |
| 5,412,772 | A | 5/1995 | Monson |
| 5,675,769 | A | 10/1997 | Ruff et al. |
| 5,706,472 | A | 1/1998 | Ruff et al. |
| 5,845,295 | A | 12/1998 | Houseman et al. |
| 5,907,672 | A * | 5/1999 | Matze et al. ................. 714/6.13 |
| 5,920,700 | A | 7/1999 | Gordon et al. |
| 5,930,831 | A | 7/1999 | Marsh et al. |
| 5,933,647 | A | 8/1999 | Aronberg et al. |
| 5,987,506 | A | 11/1999 | Carter et al. |
| 6,067,410 | A | 5/2000 | Nachenberg |
| 6,080,207 | A * | 6/2000 | Kroening et al. ............. 717/172 |

(Continued)

OTHER PUBLICATIONS

Final Office Action received in U.S. Appl. No. 10/938,473; Jan. 23, 2008.

(Continued)

*Primary Examiner* — Sheng-Jen Tsai
(74) *Attorney, Agent, or Firm* — ALG Intellectual Property, LLC

(57) ABSTRACT

The present invention provides tools and techniques for facilitating (314) management of storage (122), software (118), and other resources of a computer (102) at a distinct management computer (110) using a disassociated ample image (104) of the managed computer's storage. Ample images may be searched (310) to identify (414) infected files or illegal files, to extract (410) disk usage information, or for other reasons. Ample images may be modified (312) and then deployed (316) back to the original imaged computer and/or to other computers outside the management node. Modifications may change (502, 504, 506) application software, change (508, 510, 512) hardware drivers to match hardware changes on the target computer(s), manipulate (520) partitions, and/or perform other steps to optimize storage, software, or other resources.

16 Claims, 5 Drawing Sheets

(56) References Cited

U.S. PATENT DOCUMENTS

| | | | |
|---|---|---|---|
| 6,088,778 A | 7/2000 | Ruff et al. | |
| 6,108,697 A * | 8/2000 | Raymond et al. | 709/218 |
| 6,108,759 A | 8/2000 | Orcutt et al. | |
| 6,117,188 A | 9/2000 | Aronberg et al. | |
| 6,151,624 A | 11/2000 | Teare et al. | |
| 6,173,291 B1 | 1/2001 | Jenevein | |
| 6,173,417 B1 | 1/2001 | Merrill | |
| 6,178,487 B1 | 1/2001 | Ruff et al. | |
| 6,178,503 B1 | 1/2001 | Madden et al. | |
| 6,185,575 B1 | 2/2001 | Orcutt | |
| 6,185,666 B1 | 2/2001 | Murray et al. | |
| 6,202,070 B1 * | 3/2001 | Nguyen et al. | 1/1 |
| 6,247,128 B1 * | 6/2001 | Fisher et al. | 713/100 |
| 6,253,300 B1 | 6/2001 | Lawrence et al. | |
| 6,275,810 B1 * | 8/2001 | Hetherington et al. | 705/9 |
| 6,295,538 B1 | 9/2001 | Cooper et al. | |
| 3,317,826 A1 | 11/2001 | McCall et al. | |
| 6,330,653 B1 | 12/2001 | Murray et al. | |
| 6,377,958 B1 | 4/2002 | Orcutt | |
| 6,453,383 B1 | 9/2002 | Stoddard et al. | |
| 6,530,077 B1 | 3/2003 | Marsh | |
| 6,535,967 B1 | 3/2003 | Milillo et al. | |
| 6,606,651 B1 * | 8/2003 | Linde | 709/216 |
| 6,701,440 B1 * | 3/2004 | Kim et al. | 726/24 |
| 6,742,020 B1 | 5/2004 | Dimitroff et al. | |
| 6,766,371 B1 | 7/2004 | Hipp | |
| 6,772,192 B1 * | 8/2004 | Fulton et al. | 709/203 |
| 6,775,829 B1 | 8/2004 | Kroening | |
| 6,779,117 B1 * | 8/2004 | Wells | 726/24 |
| 6,907,604 B1 | 6/2005 | Macnair | |
| 6,922,831 B1 | 7/2005 | Kroening et al. | |
| 6,928,644 B1 | 8/2005 | Kroening et al. | |
| 7,000,231 B1 * | 2/2006 | Gold | 717/174 |
| 7,062,645 B2 | 6/2006 | Kroening | |
| 7,080,051 B1 * | 7/2006 | Crawford | 705/400 |
| 7,080,407 B1 * | 7/2006 | Zhao et al. | 726/24 |
| 7,565,495 B2 | 7/2009 | Kleinschnitz, Jr. et al. | |
| 7,565,517 B1 | 7/2009 | Arbon | |
| 2001/0005889 A1 | 6/2001 | Albrecht | |
| 2001/0047482 A1 | 11/2001 | Harris et al. | |
| 2001/0056425 A1 | 12/2001 | Richard | |
| 2002/0049853 A1 * | 4/2002 | Chu et al. | 709/237 |
| 2002/0091805 A1 | 7/2002 | Phillips et al. | |
| 2002/0140743 A1 | 10/2002 | DeLuca et al. | |
| 2003/0051128 A1 * | 3/2003 | Rodriguez et al. | 713/100 |
| 2004/0148596 A1 | 7/2004 | Watson | |
| 2004/0172574 A1 * | 9/2004 | Wing et al. | 714/4 |
| 2005/0099999 A1 | 5/2005 | Phillips et al. | |

OTHER PUBLICATIONS

Non-Final Office Action received in U.S. Appl. No. 10/406,139; Feb. 5, 2008.
U.S. Appl. No. 09/532,223, filed Mar. 22, 2000, Jenevein et al.
Non Final Office Action Dated Dec. 26, 2006, received in U.S. Appl. No. 10/938,473.
Non Final Office Action Dated May 7, 2007, received in U.S. Appl. No. 10/938,473.
Non Final Office Action Dated Oct. 9, 2007, received in U.S. Appl. No. 10/938,473.
Bart Langerweij; Bat's Preinstalled Environment (BartPE) Bootable Live Windows CD/DVD, www.nu2.nu, Aug. 23, 2004.
Sureboot; SureBoot is Revolutionary, www.sureboot.com, Aug. 30, 2004.
Beth Sheresh, Dough Sheresh, Robert Cowart; Installing and Repairing Windows NT Server, www.windowsitlibrary.com, Apr. 1999.
Duke University; Quick Start, Building PXE Server; www.linux.duke.edu, Mar. 20, 2003.
Microsoft, Creating the Workstation Boot CD, www.microsoft.com, Aug. 23, 2004.
Symantec Corporation, ON Command Discovery, sea.symantec.com, Aug. 16, 2004.
John Savill, What's Automated Deployment Services (ADS)?, www.winnetmag.com, Mar. 22, 2004.
Microsoft, imgdeploy/capture, www.microsoft.com, Jul. 15, 2004.
Microsoft, adsimage/edit, www.microsoft.com, Jul. 15, 2004.
Microsoft, imgmount/mount, www.microsoft.com, Jul. 15, 2004.
Microsoft, Automate Your Server Deployment with Automated Deployment Services (ADS), www.microsoft.com, Jan. 21, 2004.
Microsoft, Personalizing an Image, www.microsoft.com, Jul. 16, 2004.
Microsoft, How to Perform an In-Place Upgrade (Reinstallation) of Windows XP, http://support.microsoft.com, May 3, 2004.
Microsoft, How to Force a Hardware Abstraction Layer During an Upgrade or New Installation of Windows XP, http://support.microsoft.com, May 3, 2004.
Microsoft, Tools Used in the Migration Process, www.microsoft.com, May 3, 2004.
Microsoft, What is Sysprep?, www.microsoft.com, May 3, 2004.
OSR, General Guidelines for INF Files, www.osr.com, Apr. 11, 2003.
Microsoft, Using INF Files, http://msdn.microsoft.com, Jul. 20, 2004.
Rob Vanderwoude, Regedit, www.robvanderwoude.com, May 20, 2004.
Wes Miller, Deploying the Microsoft Windows.NET Server Platform, http://support.microsoft.com, Jul. 25, 2002.
Bug Club, What is PnP?, http://bugclub.org, Jul. 15, 2004.
Cornell W. Robinson III, Disk Imaging Gets a Makeover, www.nwc.com, Sep. 30, 2002.
Non Final Office Action Dated Apr. 20, 2005, received in U.S. Appl. No. 10/406,139.
Final Office Action Dated Aug. 25, 2005, received in U.S. Appl. No. 10/406,139.
Non Final Office Action Dated May 1, 2007, received in U.S. Appl. No. 10/406,139.
Non Final Office Action Dated Feb. 3, 2006, received in U.S. Appl. No. 10/406,139.
Final Office Action Dated Sep. 21, 2007, received in U.S. Appl. No. 10/406,139.
Information Protection Centers . . . ; May 11, 2000.
Citrix MetaFrame XP for Windows; 2002.
"MacOS 9.2.x—Upgrading" Mar. 19, 2003.
Kotz et al. "A detailed Simulation Model of the HP 97560 Disk Drive"; Jul. 18, 2004.
The Roles of Network Management Software; Jan. 1996.
Altiris brochures on Client Management Suite, Server Management Suite, 2003.
Altiris Press Release dated Jan. 28, 2002.
Altiris Press Release dated Apr. 30, 1999.
Altiris User Guide for LAbExpert 4.1; Copyright 2000.
"Thread: (Leaf-Devel) Dachstein—CD Available" dated Oct. 14, 2001.
Thekkath et al., "techniques for file system simulation"; Oct. 1992.
"hp open view storage data protector 5.0 product brief"; Jun. 2002.
"3 snapshot concepts and architecture"; 1999.
"5 directly create snashop envirnment"; 1999.
Veracity tutuorial manual, version 3.4; Jan. 16, 2003.
HDD duplication in RH7.3; Sep. 2, 2002.
Sistine logical volume manager; 1997-2003.
LVM How to; 2002.
Lif_utils—LIF utilities for linux v1.4; Jan. 11, 2002.
"LIF & LIF translation utilities . . . "; Oct. 9, 1989.
Prodeuct Brief "veritas makes windows usable for data center storage"; Mar. 2001.
Veritas white paper, RAID for enterprise computing; Jan. 28, 2000.
"VERITAD volume management products for windows"; Mar. 2002.
Detailed usage guide for ASP; Mar. 22, 2003.
PowerQuest white paper of PowerQuest V2i Protector; 2002.
PowerQuest imaging white paper; 2002.
PowerQuest Drive Image 2002 Product Detail; Various Dates.
PowerQuest Drive Image 3.0 Competitive Matrix; Apr. 6, 1999.
Sellers, "Connectix unveils Virtual PC 4.0"; Apr. 4, 2012.
Virtual PC for Windows User Guide; Jul. 2002.
Application Engineering Note: Creating Virtual PCs from Symantec Chost Images; Unknown Date.
Connectix BVirtual PC for Windows FAQ; Unknown Date.

(56) References Cited

OTHER PUBLICATIONS

Product Brief "Precise—Wquinn's Storage Central SRM 5.0"; Oct. 2001.
Command—Line reference (from ADSHELP.ZIP file); Unknown Date.
ADSHELP.ZIP file (provided on a floppy disc); Unknow Date.
Microsoft Windows Server 2003 Automated Deployment Services Technical Overview; Mar. 2003.
Microsoft Press Release on Automated Deployment Services Beta; Mar. 18, 2003.
Microsoft Systems Management Server Product Overview; Jan. 29, 2002.
EP Office Action received in related European Application No. 03746118.3; Jan. 16, 2008.
EP Office Action received in related European Application No. 03746118.3; Aug. 14, 2008.
Final Office Action received in related U.S. Appl. No. 10/406,139; Aug. 19, 2008.
Non-Final Office Action received in related U.S. Appl. No. 10/406,139; Nov. 24, 2008.
Notice of Allowance received in related U.S. Appl. No. 10/406,139; Mar. 12, 2009.
Notice of Allowance received in related U.S. Appl. No. 10/938,473; Mar. 17, 2009.
Roy M. Jenevein, et al; Storing a Computer Disk Image Within an Imaged Partition; U.S. Appl. No. 09/532,223, filed Mar. 22, 2000.
"Symantec Enterprise Administration: Symantec Ghost 7.0", (2001).

* cited by examiner

USING DISASSOCIATED IMAGES FOR COMPUTER AND STORAGE RESOURCE MANAGEMENT

RELATED APPLICATIONS

This application is a continuation of U.S. application Ser. No. 10/406,139 filed 2 Apr. 2003, entitled "Using Disassociated Images for Computer and Storage Resource Management," which claims the benefit of U.S. Provisional Application No. 60/370,100 filed Apr. 3, 2002, the disclosures of each of which are incorporated, in their entirety, by this reference.

FIELD OF THE INVENTION

The present invention relates generally to computer storage and other computer resources. The invention provides tools and techniques used on one computer to browse or modify a copy of stored data from another computer, in order to help manage resources of that other computer. For classification purposes, it may also be helpful to note that computer operations discussed herein comprise taking inventory of computer state and components, communicating across a network, copying, indexing, loading, searching, and writing data, as well as data operations such as partition manipulation.

TECHNICAL BACKGROUND OF THE INVENTION

A wide variety of tools and techniques are known for making backup copies of data stored on a computer's disk(s), and for restoring that data to those disk(s) or to their replacement(s) on the computer. For instance, data may be copied from a permanently installed local hard disk onto a removable medium, such as a floppy, an Iomega ZIP brand drive, or a USB portable disk drive that is temporarily attached to the computer. Data may also be copied over a network or other communications link, e.g., to archive client data on a server, or to mirror data from one server to another server. Data may be copied a few files at a time, or it may be copied in larger amounts in a file-by-file image or a sector-by-sector image. Data may be copied in a single snapshot or other archive that matches the computer's storage contents at a given point in time, in which case the snapshot may be subsequently supplemented by incremental images, to update the snapshot so that it matches the state of the computer's storage at later times. Data in a remote copy may also be continuously updated by a mirroring process, so a secondary computer's storage is updated each time a sector of data is written to a corresponding primary computer's storage.

Often data is backed up simply as a precaution, so it can be restored if a hard drive fails or a virus corrupts it, for instance. If no disaster strikes, the backup copy is often not used. On occasion, data that has been backed up is also made available as a read-only copy. This can be done, for instance, using the V2i Protector product from PowerQuest Corporation, which provides a driver that lets users mount a sector-by-sector image file as a drive on a computer running a file system under a Microsoft Windows brand operating system. (V2I and V2I PROTECTOR are marks of PowerQuest Corporation). But in general, the data produced on one computer and then stored elsewhere as a backup is often simply stored and then left alone. The backup is rarely read, except to be restored to the computer on which it was originally produced. It is rarely written, except to be updated to match a more current active state of the computer that first produced it.

By contrast, the data that is produced on a computer and then stored on that same computer is often used there in a wide variety of ways. Data is produced on a computer, and also manipulated there, through many familiar applications such as word processors, spreadsheets, and web browsers, and by the underlying operating system, file system, and networking software.

In particular, many tools and techniques have been developed for use on a computer to manage the storage and other resources of that managed computer. Examples include tools for installing, patching, upgrading, and/or uninstalling software on the managed computer; tools for optimizing storage by defragmenting files, changing partition cluster size, or performing other operations; tools for manipulating partitions or volume segments by resizing, moving, copying, or merging them; tools for recovering data despite loss or corruption of file system information; and tools for converting one file system type to another, such as converting between a FAT file system and a Microsoft NT brand file system.

PowerQuest Corporation provides many such resource management tools, as discussed at www.powerquest.com. The following United States Patents assigned to PowerQuest Corporation contain additional discussion of these and other tools and techniques for managing computer resources: 5675769, 5706472, 5930831, 5933647, 6088778, 6108697, 6108759, 6117188, 6173291, 6178487, 6178503, 6185575, 6185666, 6253300, 6330653, 6377958, 6453383, 6530077. Some of these patents discuss both modifying data to manage storage on a computer and sending data over a network to the computer, e.g., U.S. Pat. No. 6,253,300 on "Computer partition manipulation during imaging" and U.S. Pat. No. 5,933,647 on "System and method for software distribution and desktop management in a computer network environment". U.S. Pat. No. 6,330,653 discusses manipulation of virtual and live computer storage device partitions, including remote partition manipulation over a network. Other remote control software is also available, to control execution of software on one computer through a command interface on another computer. PowerQuest also owns U.S. patent application Ser. No. 09/532,223 filed Mar. 22, 2000, which is on "Storing a computer disk image within an imaged partition".

Other examples of tools and techniques used on a computer to manage the storage and other resources of that managed computer include antivirus software; and software for monitoring storage usage, blocking storage of files that exceed maximum allocated space quotas or belong to an illegal file type, determining billing for storage usage, and enforcing standardized storage locations for particular types of data. Such software is sometimes referred to as "storage resource management" or "SRM" software. Agents placed on a client computer gather information about the client computer's storage usage, hardware configuration, operating system configuration, software versions, and application software usage, for example, and send that information over a network to an administrative server. Commands are then issued from the administrative server back to the client agents, in response to administrator commands and/or policies, to be executed by the agents on the client computers.

Software for asset management or inventory control is also known. Such software gathers information about computing assets or resources, such as server and workstation hardware, system configuration, and software, including which applications are installed. Such asset management software may be considered an example of SRM software. It may have capabilities such as the conditional deployment of software upgrades or patches based on comparison of the actual configuration of a target computer and a desired configuration for that target; application usage tracking; and remote control of operations performed on a computer to manage the computer's resources.

In short, and with the benefit of hindsight gained from knowledge of the present invention, although many tools are used to manipulate data while that data is stored on the same computer that produced it, and many tools are used to make copies of data and send them to another computer, relatively little has been done to make use at a network management computer of information provided there in a backup copy of another computer's stored data. As discussed below, the present invention provides ways for disassociated backup information to be organized and put to many uses, instead of merely keeping such backups as a precaution against disaster or as a read-only copy shared by several individuals.

BRIEF SUMMARY OF THE INVENTION

The present invention provides tools and techniques which can be used on one computer to browse—or in some cases modify—a copy of stored backup data from another computer, in order to help manage resources of that other computer. Because the backup data copy is disassociated from the computer that produced it, the backup data copy can be used for management purposes without preventing continued use of the original data copy on the original computer. Depending on the management desired, the disassociated data may simply be "mined" for information and/or it may be modified and then installed back on the original computer and/or on other computers.

The present invention is defined by the claims, and to the extent this summary conflicts with the claims, the claims prevail. In some embodiments, the invention provides a method of computer resource management which comprises steps of ample image receiving; meta-data obtaining; indexing; using a management environment; and ample image searching. Some embodiments also provide at least one ample image modifying step and/or a modified image deploying step.

During the image receiving step, a management node which includes at least one management computer receives at least one ample image of storage of an imaged computer. The ample image is thus disassociated from the imaged computer, in that the management computer is distinct from the imaged computer.

During the meta-data obtaining step, the management node obtains meta-data that is structurally associated with the ample image. The meta-data may have been received with the ample image or received in a separate transmission. The meta-data includes structured image content information which describes content of the ample image, and/or structured imaged computer environment information which describes hardware that was installed on the imaged computer when the ample image was created.

During the indexing step, the ample image is indexed into a collection of ample images. One or more meta-data values are used as index keys, such that the ample image can be located by using at least part of the meta-data as a key. Database, hashing, and/or other indexing techniques can be used.

During the step of bringing the ample image into a management environment at the management node, the ample image is mounted for access by management computer system software, replicated and expanded into a virtual environment that simulates at least the storage system portion of the imaged computer, or otherwise made accessible so that a user can at least read the files and their content, and in some embodiments, can also write them.

A resource management facilitating step uses the management environment and performs at least a step of searching of the ample image. It may also perform a step of modifying the ample image. In some cases the modified ample image may then be deployed to the imaged computer and/or to another computer which is distinct from the management node.

These are examples, not a comprehensive summary. The invention provides other methods, as well as products, systems, and configured storage media. Advantages and operation of the invention can be more fully appreciated by the description which follows.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not fully determine the invention's scope.

DETAILED DESCRIPTION OF EMBODIMENTS

Figure 1:
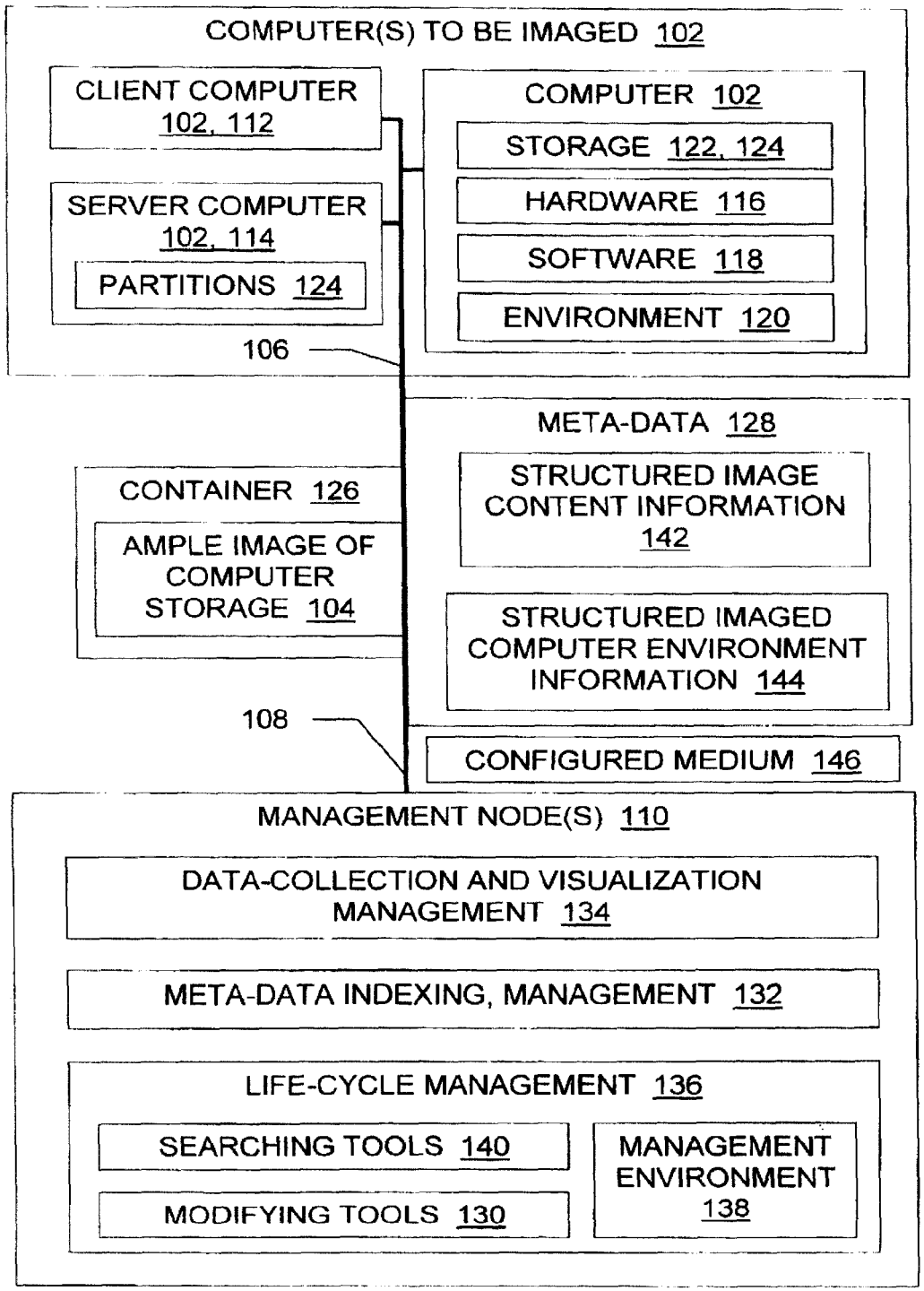
FIG. 1 is a data flow diagram generally illustrating the present invention.

In describing the invention, the meaning of several important terms is clarified, so the claims must be read with careful attention to these clarifications. Specific examples are given to illustrate aspects of the invention, but those of skill in the relevant art(s) will understand that other examples may also fall within the meaning of the terms used, and hence within the scope of one or more claims. Important terms may be defined, either explicitly or implicitly, above, here in the Detailed Description, and/or elsewhere in the application file.

Some Definitions and Examples

An "ample image" is a copy of data stored at a computer, such as a backup copy, but not every backup copy is an ample image. An ample image contains at least file names, file contents, and sector allocation information. It may contain a boot sector. It may contain attributes of individual files and/or attributes of an entire file system, such as access permissions.

Unlike a mere directory tree, each ample image contains file contents in addition to file names. An ample image may be an image of an entire disk of an imaged computer, an image of all disks of the imaged computer, an image of selected partition(s) of the imaged computer, or any other image that contains at least file names, file contents and sector allocation information.

Unlike a file-by-file image, each ample image contains sector allocation information which defines the layout of sectors on disk relative to other sectors. Thus, disk-based optimizations such as file defragmentation are preserved when an ample image is restored into a target disk. For example, an ample image may include a File Allocation Table, a cluster allocation bitmap, a partition table, and/or other sector allocation information. A complete sector-by-sector image of a disk is one example of an ample image. A sector-by-sector image of one or more partitions, but not the entire disk, is also an ample image. A one-to-one mapping between sectors in the ample image and sectors on the disk is allowed but is not required; for instance, ample images may also note the presence of empty sectors in other ways, such as by using bitmaps or data structures that identify empty sector runs (e.g., "13 empty sectors starting at sector 47"). Power-Quest Drive Image® products produce ample images (DRIVE IMAGE is a registered mark of PowerQuest Corporation.)

Because it contains sector allocation information in addition to mere file contents, an ample image, like a sector-by-sector disk image, may contain information not typically found in file-by-file images. Examples of such information include information stored in hidden partitions or hidden files, information stored on sectors outside any defined partition, and information stored inside file system structures but not in any user-defined file.

The ample image may be stored in a single file, or it may be stored in several files or blocks that are associated with one another in a recognized way through a file naming convention, by contiguity, by being identified as a group in a data structure, or by another recognizable association. File system limits on file size may require use of more than one file to hold a given ample image. Also, baseline ample images and their subsequent incremental ample images will typically be stored in different files.

The ample image may be created by conventional imaging tools such as PowerQuest's Drive Image® products (DRIVE IMAGE is a registered mark of PowerQuest Corporation), or by conventional data mirroring tools, so long as they capture more than mere file content, as discussed above. This is not to say that every ample image can be created using only conventional tools. Some ample images contain one or more meta-data files that are created according to the invention and are placed in the imaged computer's storage before the ample image is created, so that the ample image contains the meta-data file as well as other imaged data. Ample-imaged computers may be clients in a network, servers, laptops, stand-alone workstations, or other computing devices.

An ample image may be "full" in that it contains a copy of every bit and byte of the imaged computer's storage and the storage allocation information specifying how that data resided on disk(s). An ample image may be "partial" in the sense that it does not contain every such bit and byte of data. For instance, one or more partitions might not be imaged and/or the image might be an incremental image that only specifies recent changes to storage.

A "container" is one or more files, blocks, or other grouped data structures which contains at least an ample image and which is in a form permitting its transmission (over a network, or via physically transported media) toward a management computer. A container may contain meta-data in addition to an ample image.

A "disassociated" image is one that is stored offline, from the imaged computer's perspective. That is, the image is stored somewhere other than the computer that was imaged to create the image in question. It is a copy of what was in storage at some past time, and it is not the storage currently being used by the imaged computer. Disassociated images are sent to management computers, where they can be searched, and in at least some embodiments, modified. Mere replacement is not modification; modification is done in place at the management node.

An "embodiment" of the invention may be a particular system, process product, method, and/or signal which configures a computer memory or other digital or analog computer-readable medium, as described herein to one of skill. "Method" and "process" are used interchangeably herein. Except as clearly indicated otherwise by operability constraints or the teachings herein, the description of one type of embodiment informs and illustrates the other types of embodiments. For example, systems of the invention may generally be understood to operate according to the methods described herein.

"Environment data" is data that modifies or describes a particular instance of a user's data or operating environment. For example, configuration files, INI type files, or registry files that describe the operating configuration or environment contain environment data. Environment data is a type of meta-data, which can be extracted from an ample image to provides a means of identification or classification of the data or characteristics of the data in the image file.

Environment meta-data may be captured on a client computer by running one or more programs on the client computer and saving the resulting output into one or more files in the file system before the ample image is created. Particular file name(s) are used to hold the meta-data. When the ample image is created, such meta-data files are imaged, and thus become part of the ample image. After the ample image is transported to a management node, the meta-data files are read from the ample image, and the meta-data is extracted from them. Environment meta-data may also be extracted from conventional system files, such as a Microsoft Windows brand registry file. Meta-data describes the hardware and/or software environment on the client computer. It is used to index the ample image file(s) in a collection of ample images.

A "management computer" is defined relative to the ample image in question. The management computer is any computer operating according to the invention to search and/or modify the ample image, which is not the imaged computer whose resources are being managed offline. One or more management computers working together are referred to herein as a "management node".

A "management environment" is an environment on a management computer which permits an administrator to at least browse (a.k.a. search or mine) an ample image of some other computer's storage. It need not require execution on the management computer of code that is stored in the ample image. But it must provide at least the ability to perform at least one file system-type operation to read files and directories, and in embodiments that permit modification of the ample image at the management computer, the management environment must also permit at least one file system-type operation to write file and/or directory data. File system-type file and directory reads permit operations such as reading a directory to list all files, to list file attributes (size, creations date, permissions, etc.), to search a directory tree with wildcards, and to read file contents. File system-type file and directory writes permit operations such as creating, renaming, and moving files or file contents. Similar definitions pertain to volume, partition, and other storage structure reads and writes.

One suitable management environment is provided by a conventional file system that is running on a management node computer, in combination with a driver that supports mounting the ample image for at least read-access there by an administrator. One suitable read-only driver is provided by the V2i Protector product from PowerQuest Corporation. (V2I and V2I PROTECTOR are marks of PowerQuest Corporation). Read-write drivers are to be implemented and provided in some embodiments according to the invention. To the management computer operating system/file system, the mounted ample image looks like a standard local folder/volume/partition/disk, so that applications running on the management computer can access the ample image's data using standard operating system/file system calls.

Another suitable management environment is a virtual environment which contains data structures and code simulating at least storage system aspects of an imaged computer. Implementation of such a virtual environment may be informed by reference to the Virtual PC product of Connectix Corporation (see www.connectix.com) and/or by the discussion of a virtual engine environment, its components, their uses, and related information, in PowerQuest's U.S. Pat. No. 6,330,653 at FIGS. 2-8 and columns 3-44. Virtual environments support storage operations (read/write) that can act on the content of an ample image without running file systems/operating system code that is stored in the ample image and that would have been used on the imaged computer to perform the operation(s) in question.

Some implementations may run, on the management computer, file systems/operating system code that is stored in the ample image, if that is necessary to perform a hardware device driver or software application installation. This may be used to change the installed hardware support identified in an operating system registry, for example. But in general, only the storage system aspects of the imaged computer are needed at the management computer, not the full execution environment of the imaged computer.

"Meta-data" is structured data that describes the content and/or context of an ample image. Examples of meta-data include "structured image content information" and "structured imaged computer environment information". In each, the structure provides a computer-parseable structure, which distinguishes meta-data from free-form information or natural-language commentary like that found in readme files, press releases, email message bodies, and other texts intended primarily for human readers. For example, XML, data structure definitions, file formats, pointers and other addresses, indexes, and databases all provide computer-parseable structure.

Examples of structured image content information include: data specifying which applications were installed on the computer when the ample image was created, and may include version numbers; data specifying which operating system(s) were installed on the computer when the ample image was created, and may include version numbers, service release numbers, and patch history; file settings; other data which describes content of the ample image.

Examples of structured imaged computer environment information include: the time at which the ample image was created; the name of the user of the imaged computer; the name (e.g., machine address, processor ID, IP address) of the imaged computer; hardware that was installed on the imaged computer when the ample image was created.

Some meta-data, such as directory trees and Microsoft Windows brand registry entries, are implicitly stored in the ample image they describe. They are implicit in the ample image, in that they were created and placed in the ample image for purposes other than the methods of the present invention. The present invention provides new uses for such previously known data. Meta-data may also be explicitly stored in the ample image, by writing the meta-data to a file expressly for use by the present invention, and then creating an ample image which comprises that meta-data file. Meta-data for a given ample image may also be explicitly stored in a file that is stored outside the ample image but structurally associated with it. Network packets and other data structures that can be sent to a management computer are equivalent to files for the purpose of determining whether meta-data is present, although some specific file or other data structures will provide better speed/reliability/etc. than others in a particular implementation.

Meta-data is "structurally associated" with an ample image by: using the meta-data as an index to locate the ample image in a collection of images; applying a file-naming convention so that the ample image file name corresponds to the name of at least one file containing meta-data for that ample image; placing meta-data in the same file(s) as the ample image to which that meta-data pertains; or otherwise providing a computer-parseable structural linkage between the ample image and meta-data for that a pie image.

For instance, the invention provides an embedded meta-data file data management technique in which a file included in the ample image describes the contents of the ample image in computer-readable form. The file contains meta-data useful in describing the ample image inside which it is stored and the computer in which the ample image was taken. One can provide the ability to enable/disable the including of the file in the ample image. Examples of such meta-data include a file list, disk statistics, image creation date, computer name, other hardware configuration data, other software configuration data. This helps make ample images portable from computer to computer, helps provide quick identification of image contents without searching the entire image, and helps provide quick identification of the environment in which the image was taken. Like other features discussed herein, not every feature necessarily appears in every embodiment of the invention.

"Mining" refers to searching an ample image to extract data that facilitates computer resource management.

An Introduction

The invention provides tools and techniques for computer storage life-cycle management. As illustrated in FIG. 1, one or more computers 102 are imaged, and then the image(s) 104 are used to help manage resources such as storage capacity, applications software, data files, and hardware drivers. The managed computers 102 may be stand-alone machines, or they may be connected to a network 106. If a network 106 is present, it may use known protocols or other tools such as HTTP, TCP/IP, XML. The network 106 can be owned and managed by a single entity, such as a corporation or a government agency, or by multiple entities. The network 106 or some other data transmission tool 108, such as shipped or carried DVDs or tapes, is used to transmit images 104 from the managed computer(s) 102 to one or more management computers 110.

The managed computers 102 may be network clients 112, network servers 114, or other computers. Each computer 102 has a hardware configuration 116, e.g., motherboard, processor, volatile storage, display, input devices, non-volatile storage, connection and connectivity devices. Each computer 102 also has a software configuration 118, e.g., one or more installed operating systems, corresponding license and computer naming information for the installed operating systems, application software, corresponding version and license information for that software, and user data. Each computer 102 operates in the context of a current environment 120, e.g., domain, workgroup, login validation information, access rights, settings, preferences, installed devices, and installed optional software.

Each computer 102 also has one or more local disks and/or other storage 122, on which the software and the user data 118 are stored. Each disk is organized into one or more partitions 124. Partitions are either formatted or unformatted. Unformatted partitions hold no data. Each formatted partition holds at least file system data, and also holds zero or more files. Each file typically contains data. Examples of files include operating system files such as registry files, configuration files, operating system code; application files such as initialization files, application code, sample or tutorial data; user files such as data files produced by users while using applications.

Because hardware, software, and context are often functionally linked in a computer, those of skill will appreciate that statements herein regarding any one of the components 116, 118, 120, 122 of a computer 102 may apply equally, for purposes of the present invention, to some or all of the other components. For instance, software 118 may be installed or removed, and so may hardware 116. Indeed, characterization of a given component as belonging to one of the categories 116, 118, 120, 122 may be more a matter of convenience or perspective than one of widespread consensus. For example, one may view a given component either as BIOS code 118 stored in a computer chip, or as a computer chip 116 that contains some BIOS code.

Regardless, the invention provides "offline" storage management, from the managed computer 102's point of view. That is, the invention provides storage management capabilities which use a copy of data from a computer's storage 122, in a place that is remote from the computer 102, to help manage the resources of the computer 102. In some cases the same computer 102 may also be managed online in a conventional manner, e.g., by using conventional SRM software which is running and controlled locally at the computer 102, or by using conventional SRM software that is controlled remotely, but which runs on the computer 102 and accesses the local storage 122 as its primary data source. The invention is generally compatible with, but does not require, conventional online resource management.

One inventive approach includes taking a snapshot image 104 of a client 112, placing that snapshot image into a container 126 with meta-data 128, sending 108 the container 126 to another computer 110 such as an administrative server, modifying 130 the image there, sending 108 the modified image 104 back to the client 112, and installing the modified image on the client 112. Variations and alternatives are also discussed herein, including some in which the image 104 is not modified, and some in which an image 104 (modified or not, but at least indexed and searched) is installed on some computer other than the imaged computer 102 it originally came from.

Data collection and visualization management software and supporting hardware 134 allows administrators to perform tasks such as scheduling imaging, scheduling collection of meta-data, and managing the indexing 132 of images 104 into a collection organized for retrieval by specifying meta-data values. Meta-data may be structured image content information 142 such as directory trees or a list of installed applications, and/or structured imaged computer environment data 144 such as a list of installed hardware 116 or an IP address.

Life-cycle management software and supporting hardware 136 allows administrators to perform tasks such as bringing a specified image 104 into a management environment 138, searching the image 104, modifying the image 104, and (re) deploying the (modified) image 104 to one or more computers which may include the computer 102 on which the image 104 originated.

A Detailed Example

Figure 2:
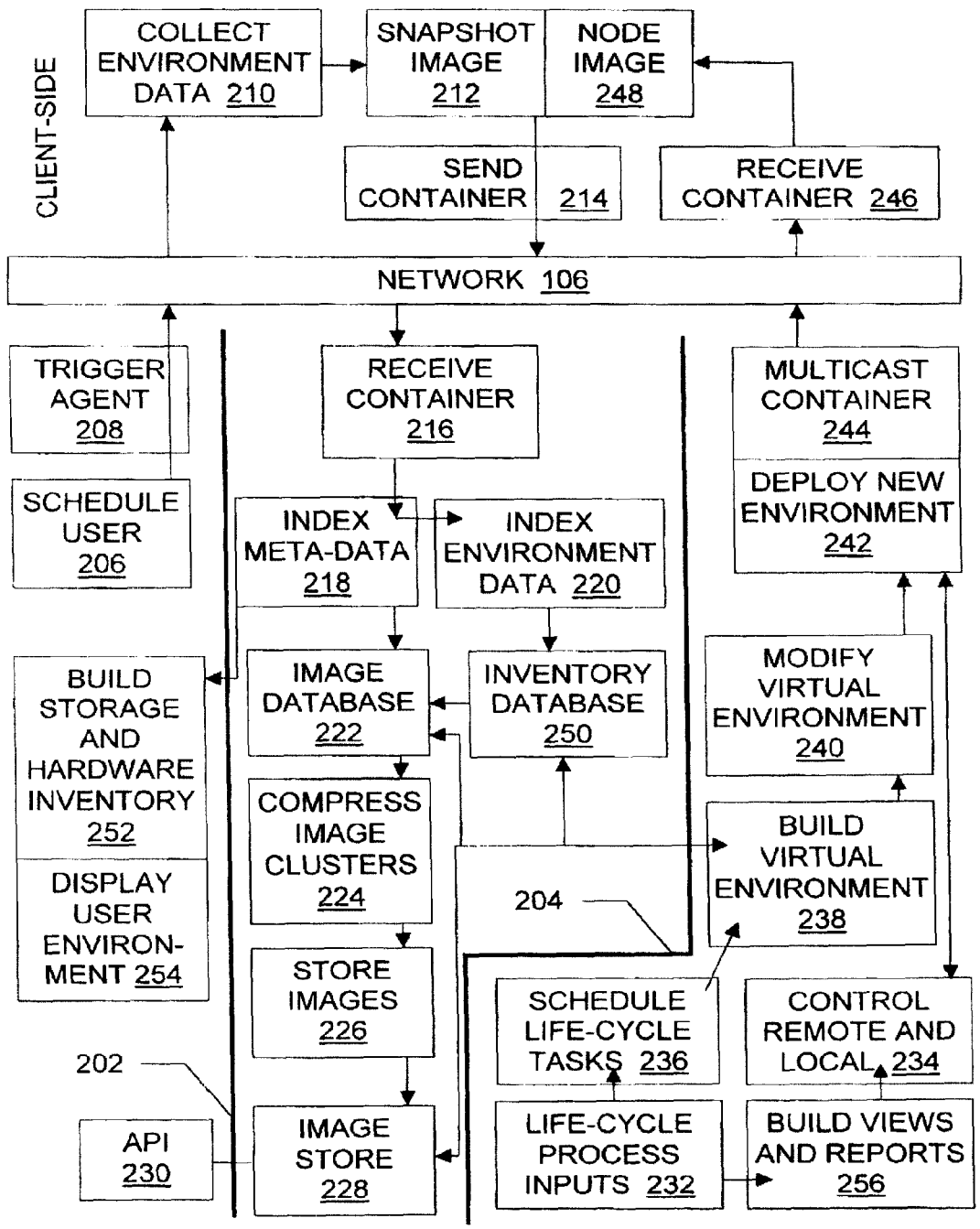
FIG. 2 is a data flow diagram further illustrating some embodiments of the present invention.

FIG. 2 further illustrates a particular embodiment, which is more focused and hence narrower than the inventive data flow and architecture shown in FIG. 1. For instance, FIG. 2 calls for a virtual environment, which is a particular kind of management environment 138; FIG. 2 assumes environment meta-data 128 is collected by an agent on a client computer 102; and FIG. 2 provides for image 104 compression and an image store which are not required in FIG. 1. Accordingly, limitations of FIG. 2 are not necessarily found in every embodiment of the invention, but are presented instead to further illustrate some possible embodiments.

At the most general illustrated level of FIG. 2, client-side components are both distinguishable from and connectable to three other groups of components by a computer network 106, which is one instance of a transmission means 108; other transmission means include, e.g., placing images 104 on DVD or tape and shipping the DVD or tape. The other three component groups illustrated in FIG. 2 are: data collection and visualization management components 134, shown to the left of a grouping line 202; meta-data indexing and management components 132, shown between grouping lines 202 and 204; and storage life-cycle management components 136, shown to the right of grouping line 204. The grouping lines 202, 204 are for clarity of illustration and discussion only, and they do not necessarily require any corresponding dividing or grouping structure in a given embodiment of the invention.

In the dataflow architecture shown in FIG. 2, an administrator schedules 206 resource management for a particular user. In particular, this sends a triggering instruction 208 over the network 106 to a client computer 102 agent, which is part of the software 118 running on that client 102, 112. The agent collects 210 environment data 128, 144 reflecting the environment 120 and/or hardware 116 context, and takes 212 an ample image 104 or directs imaging software on the client 112 to take 212 an ample image 104. The agent may also collect other meta-data such as the user name, and the image 104 will typically contain content meta-data 142, 128 such as directory information and software 118 installation information in a registry. The agent bundles the image 104 and the meta-data 128 into a single container 126 for easier transport administration, and sends 214 the container 126 over the network 106 to a management node 110.

The management node 110 receives 216 the container 126, and separates/extracts the image 104 and the meta-data 128. The content meta-data 142 is indexed 218, and the environment meta-data 144 is indexed 220. Indexing may be done using conventional database indexing techniques and tools, familiar hash algorithms, and/or other approaches. The image 104 is stored 614 in a collection of images, which in this example is a database 222 of images; an indexed collection of files or storage blocks could also be used without a relational database so long as meta-data is indexed to permit image location 612. The environment meta-data 144 is stored in an inventory database 250. A joint database combining components 222, 250 could also be used.

The image database 222 is a storage location where the image 104 files are kept. One can specify characteristics of each image. For instance, it can be associated with a client computer so that the correct image can be later retrieved for restoration of the client computer. Images 104 may also be retrieved for further data extraction and/or image modification prior to restoration.

For example, one can locate 612 (and subsequently retrieve) a given image 104 in the image database 222 by specifying corresponding meta-data 128 values. One could locate all ample images 104 stored 614 in the database that were created within a specified time window, or all images for a given user (who might have used more than one machine 102), or all images for a given machine 102, or all images for machines that have a specified network card installed, or all images for machines 102 that lack a particular application program, or some Boolean/database query language combination of such meta-data key values.

One could also use the gathered meta-data 128 to build 252 an inventory summary of the hardware 116, software 118, storage devices and capacities 122, and/or other characteristics of the computers 102. The inventory database 250 would not always be current, since it is based on information collected from computers 102 when they are imaged, rather than being continuously updated as conventional SRM software may do. User environment information 220 may be displayed 254 to an administrator.

In some embodiments, the inventory database 250 is an indexed collection of data about is the installed hardware 116 and software 118 on each client computer 112. This inventory database 250 is searchable to allow both reports and policies to be executed against selected conditions. For example, decisions to upgrade to a new operating system can be based upon the ability of existing client computers 112 to handle the minimum hardware requirements, and reports can be generated 256 identifying the upgrade or replacement hardware that is necessary to bring the lacking client computers 112 into compliance. This is also true for making decisions about upgrading software applications 118. The hardware inventory information is collected by agents or other programs running on the client computers 112. The results can be sent to the inventory database apart from the image 104, or they can be placed into a known file before imaging so that file will be in the image 104 that is sent up to the management node 110, where it is extracted from the image 104 and placed into the database 250.

In the illustrated architecture of FIG. 2, extremely large amounts of image data may be managed. Accordingly, to reduce storage requirements, image clusters (blocks, sectors, etc.) may be compressed, to remove space-consuming redundancy within a given cluster and/or to identify identical clusters within more than one image 104. Compressed images are stored in an image store 228. Thus, the image store 228 is an optimized storage of multiple image 104 files where redundant pieces have been identified and replaced with references to fewer (ideally just one) stored copy of the imaged data. It is managed though an API 230 or other interface. An incremental image 104 may be merged with a prior complete snapshot image 104 to form a complete and more recent snapshot image which is placed in the image database 222 and/or the image store 228. A given image 104 in the image store 228 may also be the result of both image compression and merging in of incremental images.

The image compression 224 and the image store 228 provide an efficiency enhancement to the illustrated architecture, but aspects of them have been the subject of discussion outside PowerQuest more than a year prior to the priority date of the present application. For purposes of the present application, PowerQuest therefore does not intend to claim components 224, 226, 228, and/or 230 in and of themselves. PowerQuest will not object hereafter if components 224, 226, 228, and/or 230 are treated as prior art for examination purposes, regardless of whether a court of competent jurisdiction ultimately determines them to be prior art.

In some embodiments, the meta-data 128 identifies the user of the client computer; the imaging 212, meta-data 128 gathering, transmission 108, and indexing 218, 220 steps discussed above are repeated for multiple computers 102; user identifications are copied from the meta-data 128; and the image database 222 is built using the user identifications of multiple client computer containers 126 and images from those containers 126. The user identifications become 132 keys in the index 218/220 into the image database 222, so that one can locate 612 a particular image 104 by specifying the user identity. The time at which a container 126 was created, modified, or otherwise processed and time-stamped, can also be used as a meta-data key. Thus, one could locate all images 104 for a given user across time and/or across several machines 102, all images created within a given time window on one or more specified machines 102, or all images for a given user created in a given time window. A given embodiment may index 306 by one or more of the following meta-data 128 values: user name, computer name, image creation time, IP address, hardware installed, operating system type and version installed, application name and version installed, registry file content. Creation and use of indexes (e.g., database keys) is, in and of itself, well-understood technology, but embodiments that index 306 according to the present invention are believed to be new.

Turning now to the storage life-cycle management components 136, shown in FIG. 2 to the right of grouping line 204, inputs such as user commands and policy specifications are received 232 through an interface. Resource management policy specifications in the inventive system are read from a computer-readable medium (volatile or not) in a computer-parseable form. Some inputs cause an embodiment to build 256 views showing the imaged computer's state at a specified time, and/or to build reports showing trends in storage usage, for example. Both local controls operating on the images 104 in the management node 110, and remote controls operating through the network 106 on imaged computers 102, may be invoked in a command interpreter 234 to gather information for reports and views, or perform searching 310 and/or modifying 312 steps on disassociated ample images 104.

An administrator may schedule 236 storage life-cycle management tasks, such as upgrading images 104 with new drivers or other software 118 and deploying them, or tasks otherwise modifying images 104 and deploying them.

Ample images 104 are used in the illustrated system to build 238 a virtual environment, which can then be used as a management environment 138 to search 140 and/or modify 130, 240 the image 104 as it is embodied in that virtual environment on the management computer 110. Modified images 104 can be deployed 242 as new storage environments for one or more computers 102. Images 104 may also be deployed without modification, for familiar purposes of backup retrieval or disaster recovery. If one image 104 is to be deployed to multiple computers 102, it can be placed in a container 126 suitable for multicasting 244 over the network 106. The image 104 being deployed is received 246 at the target computer(s) 102, and imaged 248 into (partial ample image such as one that omits a partition 124) or onto (full ample image) each target computer's storage 122.

In some embodiments an image is recreated from the image store 228 or copied from the image database 222 and combined with the client's hardware and software configuration information from the inventory database 250, and is then used to build 238 a new virtual environment. Then the virtual environment is modified 240 as desired. A full image 104 in a virtual environment contains the necessary operating system software, application software and the required configuration files as well as the operating system and application data for use on a client computer 102, but with the invention the ample image 104 is configured without the need for the actual computer 102 to be used during the configuration process.

More about Modifying Ample Images

The ample image 104 may be modified and then redeployed back to the imaged computer. For instance, storage 122 may be reorganized and/or optimized. Files may be defragmented. New hardware drivers may be installed (driver software added if not already present, changes made to registry, etc.), to match hardware changes in the imaged computer that are/will be made after the ample image was created. Files may be rearranged in the ample image to make disk operations more efficient in other ways, e.g., by placing together on disk files that are frequently accessed together in time. Partition cluster size may be changed so that less storage space lies in the unused portion of clusters. Directory storage space may be reclaimed. Storage may be divided between partitions 124, e.g., by placing user data in one partition and system data and software in another partition.

(Re)deployment of a modified ample image 104 may be one-to-one with the imaged computer, but it need not always be one-to-one. In a redeployment that is one-to-one with the imaged computer 102, an ample image of imaged computer A is taken, sent to management computer B, modified there, and then redeployed back to computer A only. The redeployed image replaces/overwrites the original data. In a first variation, an ample image of imaged computer A is taken, sent to management computer B, modified there, and then redeployed back to computer A and also deployed to one or more other computers C, D, E, and so on. In a second variation, an ample image of imaged computer A is taken, sent to management computer B, modified there, is not redeployed back to computer A, but is deployed to one or more other computers C, D, E, and so on.

In a third variation, an ample image of imaged computer A is taken, sent to management computer B, modified there, and then split between two or more computers on (re)deployment. For instance, suppose a single first server 114 is providing both web services and accounting services. Then a second server is purchased. To configure the second server, and reconfigure the first server, an ample image 104 of the first server is made and sent to a management computer 110. On the management computer, while the first server continues to run, the ample image is modified by splitting it into two ample images, one of which is suitable for a web server without accounting capabilities, and the other of which is suitable for an accounting server without web server capabilities. Then the two ample images are deployed. One overwrites the original server 114, and the other configures the new second server. As a result, the invention permits the functionality originally borne by a single server to be split between two (or more) servers, with relatively brief downtime, and thus puts less intense time-pressure on administrators during the reconfiguration process.

Some of the suitable modifications that may be made 240 to a virtual environment, or otherwise made to an ample image 104 according to the invention, include handling 530 viruses by detecting viruses and then quarantining/repairing/deleting infected files; taking 252 an inventory of the installed hardware and software present when the computer 102 was imaged; updating 504 applications with new releases and/or patches; checking 618 the integrity of a file system; defragmenting 522 one or more files; removing 532 one or more illegal files as defined 606 by corporate information systems policies (e.g., MP3 music files, picture files, or other copyrighted files that lack clear authorization); checking 608 for security breaches by scanning for controlled or sensitive document or other information files; checking 608, 534 for remote mail folders that might constitute security policy violations; separating 620 data and systems volumes by identifying data folders and files, creating 520 a data volume, moving 622 the folders and files to the data volume and adjusting 516 the operating system and application configuration data to reflect the new logical location of the data (other separations could also be performed 622, e.g., migrating application software to one partition 124 and system software to another partition); sorting 624 files by type, function, or department, and combining 626 like files to provide a single master file on a server with clients having links defined to access the master copy; mapping 628 information location by enforcing standardized storage locations for the storage of particular types of data on all client computers; mapping shortcuts 630 by defining links and short cuts in the environment settings of all client computers to access certain data.

The modified virtual environment is then placed in a container file and sent over the network 106 back to the client computer 102. If multiple clients 102 should have the same modified storage environment, then the modified environment can be multicast 244 to those clients. An agent on each client then installs the modified image 248 onto the client, thereby making it the new storage environment of the client. The installation is accomplished by writing the container file content back to the appropriate locations on the hard disk(s) of the client computer and rebooting the client computer 102.

Thus, some embodiments of the invention include tools and techniques to read and temporarily store the image 104 of a specific users)/groups of users/computer(s) environment. The image 104 is indexed by user(s)/computer index and time of capture. At the management node 110, one can create a virtual environment or other management environment 138 that matches the current or historical state of the user(s)/ groups of users/computer(s) environment, for the purpose of refreshing, or modifying the user(s)/groups of users/computer(s) online environment. Particular user(s) may need to it) have a display driver updated 510, for instance, because they all have the same display hardware. Likewise, a group of computers 102 may have been imaged just before a virus infected the enterprise, and so their active state can be rolled back using the saved images.

Embodiments may provide a language that allows the automation of methods discussed herein, so an administrator can customize the process by creating batch command files. Such a language could allow the administrator to specify some or all aspects of assembling a specific operating environment or active state, including files and configuration information. Administrative server 110 applications 140 could search the saved images 104 and associated meta-data 128 for the purpose of reporting on, managing and subsequently modifying the operating environment based on the current and historical states of user(s)/computer environments.

More about Methods

Various embodiments of the present invention may be more fully understood by considering flowcharts illustrating methods of the invention. As noted elsewhere, system embodiments operate according to the methods discussed herein, as governed by the claims. The context, purposes, and results of method steps are likewise illustrated by the system and dataflow embodiments shown in FIGS. 1 and 2, and the discussion of those figures.

Figure 3:
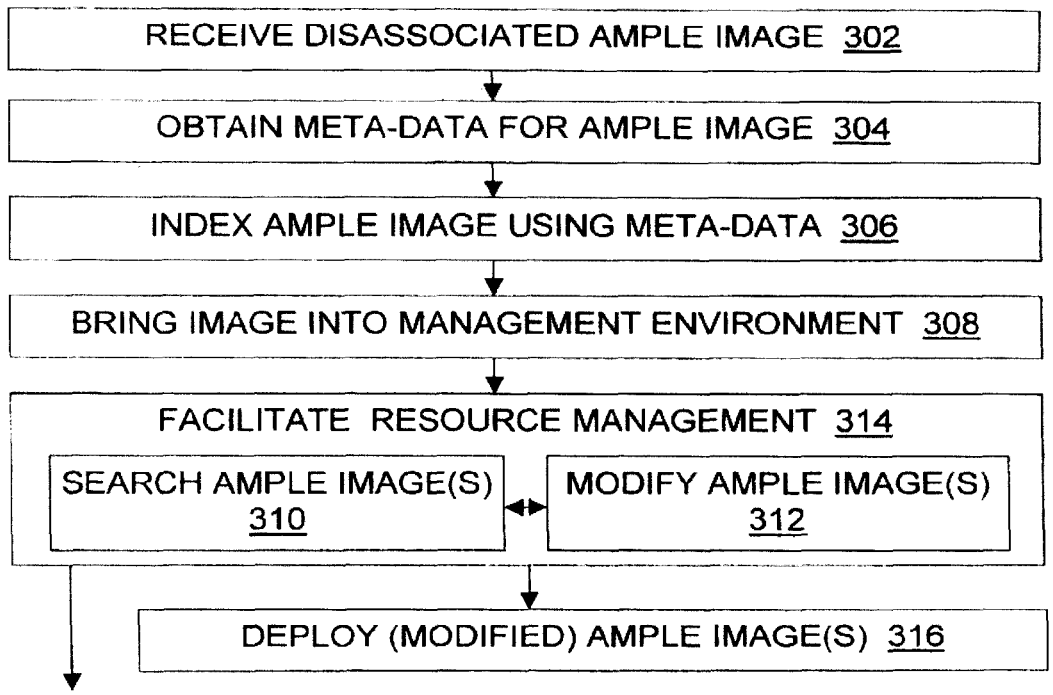
FIG. 3 is a flowchart generally illustrating methods of the present invention, with emphasis on the perspective of a management computer that manages other computers' storage-related resources.

FIG. 3 illustrates a method 300 of computer resource management according to the present invention. During a receiving step 302, the management node 110 (which includes at least one management computer) receives at least one ample image 104 (partial or full) of storage 122 of an imaged computer 102. The ample image 104 may be received as a single container 126 or as a single image file 104. Or it may be received in parts, as a sequence of image files which together comprise the ample image 104. Regardless, the ample image 104 is disassociated from the imaged computer 102 in that the ample image 104 is at the management computer 110 and the management computer 110 is distinct from the imaged computer 102.

During an obtaining step 304, the management node 110 obtains meta-data 128 that is structurally associated with the ample image 104. The meta-data 128 includes at least one of: structured image content information 142 which describes content of the ample image 104, and structured imaged computer environment information 144 which describes hardware 116 (or equivalently, hardware drivers/registry entries) that was installed on the imaged computer 102 when the ample image 104 was created 212. Meta-data may be embedded in the image 104, either in standard operating system and file system structures or in a file dedicated to meta-data. Meta-data 128 may also be outside the image 104 but inside the container 126. Finally, meta-data 128 may be transmitted separately from the image 104 and/or the image container 126.

During an indexing step 306, the ample image 104 is indexed into a collection of ample images, e.g., image database 222, such that the ample image can be located by using at least part of the meta-data 128 as a key. The meta-data 128 may be indexed 306, 218 into one or more databases or other data structures, to permit use of the meta-data as a key in locating the image, and optionally to permit use of the meta-data for other purposes, such as building an inventory database 250. In some embodiments, for example, the indexing step 306 indexes the ample image 104 into a collection of ample images such that the ample image can be located 612 by using at least part of the meta-data 128 as a key, where the image 104 is indexed by at least one of: a user name, a computer name, an image creation time, an IP address, a value identifying installed hardware, a value identifying installed operating system type, a value identifying an installed application, a value given in a registry file of the imaged computer.

During a bringing step 308, the ample image 104 is brought into a management environment 138 at the management node 110. This may require building 238 a virtual environment, or it may require use of a driver that lets an image 104 be mounted as a volume at the management node 110 so the mounted image is accessible to system and applications software running on the management computer 110.

Steps 310 and 312 are instances of a resource management facilitating step 314. Commands to perform steps 314 may be input interactively and/or in a script of batch-mode user commands, so the facilitating step is performed in response to interactive-mode user commands and/or in response to a script of batch-mode user commands. Commands may be triggered by a specified event or condition, or a combination of events and/or conditions. Commands may be subject to policies specified 606 by an administrator. Policies can trigger management actions such as running a script, creating a report, and/or sending 616 an alert to an administrator.

Either or both steps 310, 314 are performed at least once using the ample image 104 in the management environment 138. During image searching step 310, the directory tree, file contents, partition table, and/or other content of the ample image 104 is searched. Searching 310 involves looking inside the ample image 104, not merely looking at file system characteristics of the file(s) that contain the ample image 104. During image modifying step 312, the directory tree, file contents, partition table, sector allocation information, and/or other content of the ample image 104 is modified. Modifying 312 likewise involves changing information inside the ample image 104, not merely changing file system characteristics of the file(s) that contain the ample image 104.

During an optional deploying step 316, the ample image (possibly modified) is deployed over a network 106 or other transmission means 108 to the imaged computer 102 and/or to another computer which is distinct from the management node 110. Familiar image deployment tools and techniques may be used.

Figure 4:
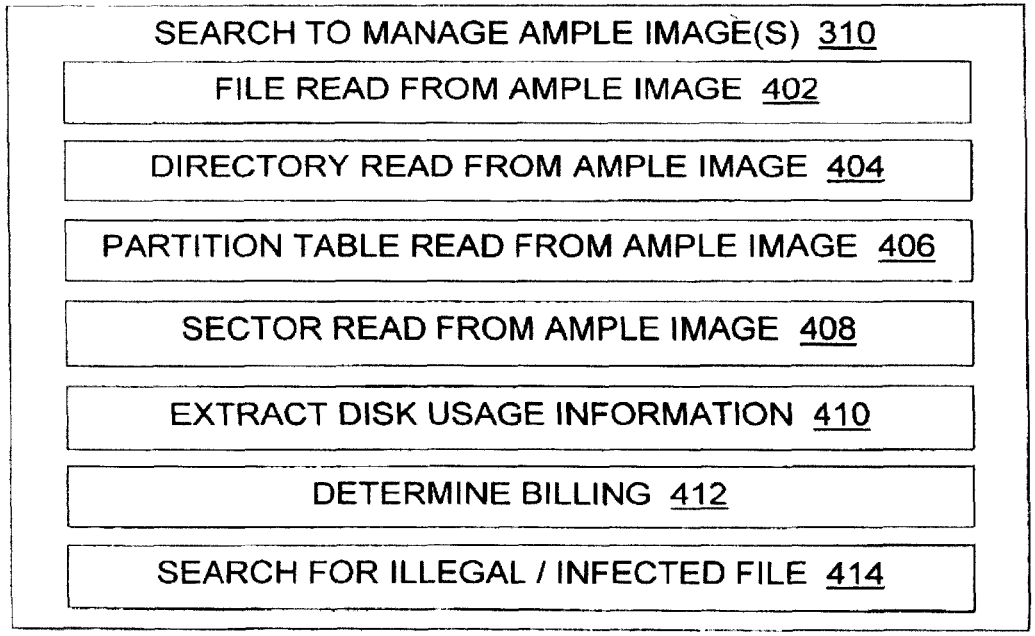
FIG. 4 is a flowchart further illustrating ample image searching steps of the present invention.

FIG. 4 further illustrates steps which may serve as image searching steps 310 in the management environment 138 of a given embodiment and/or in a given situation. These are illustrative only. The list shown is not necessarily comprehensive, and some of the steps may overlap, e.g., reading a file involves reading sectors. Not every listed step need be present in every embodiment. As with all flowcharts provided herein, steps may be grouped differently, reordered (except to the extent that one step requires results of another step), repeated, omitted, performed concurrently, and/or renamed in a given embodiment, to the extent that doing so still provides an operable embodiment consistent with the claims.

A file reading step 402 reads a file from a disassociated ample image 104, that is, from an image 104 in a management environment 138 at a management computer 110 that is distinct from the computer 102 whose image 104 is being read. A directory reading step 404 likewise reads file system directory information from a disassociated ample image 104; this may be done, for instance, to determine whether a particular file is present, to determine whether at least one file of a particular type is present, or to check for compliance with policies stating what types of files are stored in a given directory. A partition table reading step 406 reads partition table information from a disassociated ample image 104. A sector reading step 408 reads a disk sector from a disassociated ample image 104; it may also read a cluster or block containing multiple sectors. The sector read may be in a file, or it may lie outside any file. A disk usage information extracting step 410 performs similarly to conventional SRM disk usage information extraction but reads from a disassociated ample image 104 instead of reading from a local machine it runs on. Likewise, a billing determination step 412 performs similarly to conventional SRM billing determination but reads a disassociated ample image 104 to determine billing for the imaged computer 102 instead of the (management) computer 110 it is running on. A searching step 414 reads a disassociated ample image 104 to check for illegal files (such as MP3 files, or limited distribution files on an unauthorized machine 102) and/or to check files for virus infection.

Mining 310 an ample image 104 according to the present invention is different in several respects from mining storage 122 locally while that storage is in use. First, the ample image is not current, so the information it provides is aged. Second, by mining several ample images taken at different times, the present invention provides information about trends that is not limited to predetermined variables—any data in the ample images 104 can be examined at any imaged point in time. Third, by mining several ample images taken from different machines 102 at substantially the same time, and doing this for sets of images at different times, the invention can help administrators identify the entry point/origin of suspect files (illegal files, viruses) and the propagation path(s) of suspect files. Travel across time and across the network with a focus on variables dynamically identified during the search is easier. Fourth, the present invention can provide detailed information about machines 102 that are not running, including machines that are now difficult or expensive to run because of changed circumstances. This may save administrative overhead and/or facilitate forensic investigations. Fifth, although agents can be used to gather environment meta-data, not every embodiment of the invention requires an agent running on the imaged computer 102. Environment meta-data may be gathered from a registry, or it may be omitted entirely.

Disassociated images 104 may be mined 310 according to the invention using software that does—on the mined image 104—the same kind of operations that conventional SRM software does on the original storage 122 (either locally or via remote control). Like conventional SRM tools, some of the systems and software according to the present invention can be controlled partially or entirely by policies which are set 606 by an administrator. Such policies may set disk quotas, identify illegal file types, specify particular storage locations for particular types of data, require antivirus software to be current to within a specified time period, and/or require or prohibit certain hardware or software configurations, for instance. However, unlike conventional SRM operations, the methods of the present invention are not done in real-time on the actual system 102 whose resources are being managed, but can be done instead at the administrator's convenience using an ample image taken from the managed computer 102 to a manage-merit computer 110.

Figure 5:
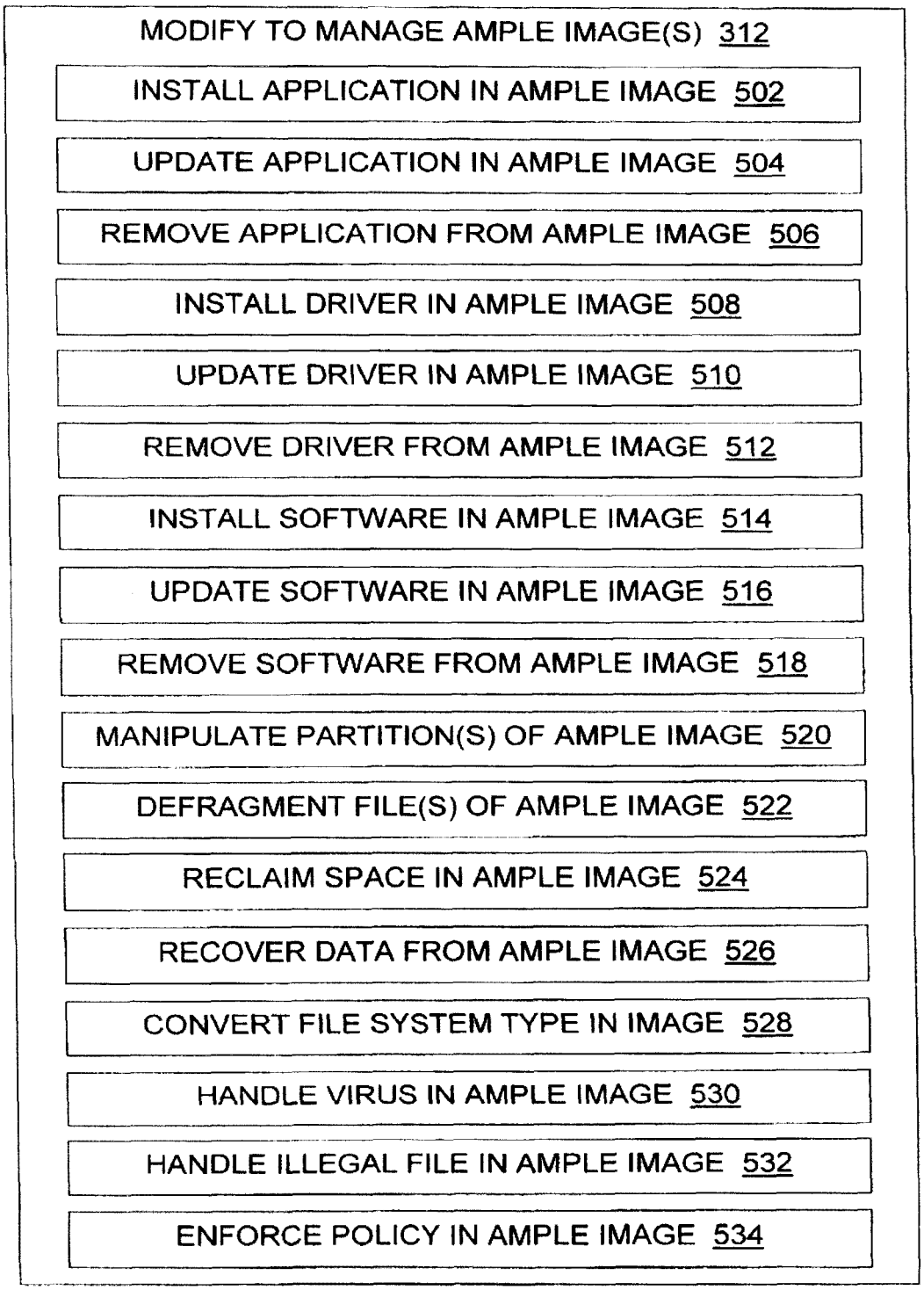
FIG. 5 is a flowchart further illustrating ample image modifying steps of the present invention.

FIG. 5 further illustrates steps which may serve as image modifying steps 312 in the management environment 138 of a given embodiment and/or in a given situation. It will be understood that these modifications take effect on managed computers 102 only if the modified image 104 is deployed 316 to the managed computer(s) 102. As with FIG. 4, the steps in FIG. 5 are illustrative only, not necessarily comprehensive or required, and may overlap. As illustrated, resource management methods of the invention may modify 312 the ample image 104 by performing at least one of the following steps on the disassociated ample image 104: installing 502 an application; updating 504 an application by patching code, adding new data files such as virus definitions, or otherwise; removing 506 an application (which may include regular uninstalls that update the registry, as well as bare file system deletes that may not); installing 508 a hardware driver; updating 510 a hardware driver; removing 512 a hardware driver; installing 514 system software other than a hardware driver, such as an operating system or communications software; updating 516 system software other than a hardware driver; removing 518 system software other than a hardware driver.

Each of these steps 502 through 518 facilitates management 314 of software 118 as a resource. Note that removing a piece of software is done by uninstalling, overwriting, disabling, and/or deleting that software. Removing is directed specifically at that software rather than the entire image 104, since one does not normally delete an entire image from the management environment 138 merely to delete a particular program. Software installation, updating, and removal, in and of themselves, are well-known in other contexts, but their use on ample images 104 according to the present invention is believed to be new.

In addition to, or in place of, the foregoing image modifying steps, the invention supports modifying 312 an ample image 104 to manage storage capacity and/or to help manage 314 the organization of items within storage 122. For example, a partition manipulating step 520 is performed by performing at least one of the following steps on the ample image 104 in the management environment 138: creating a partition 124, resizing a partition, resizing clusters of a partition, moving a partition, moving data between partitions, canonizing a partition, deleting a partition, merging two partitions, manipulating volume segments. Partition manipulations, in and of themselves, are well-known in other contexts, but their use on ample images according to the present invention is believed to be new. Storage capacity may also be managed 314 by defragmenting 522 files in the ample image 104, by reclaiming 524 directory space in a partition 124 of the ample image 104, by recovering 526 data despite corrupted or lost file system information in the ample image 104, and/or by converting 528 one file system type to another file system type (e.g., converting between FAT and Microsoft NT brand file systems) in the ample image 104.

In some embodiments and/or situations, the invention provides a method that comprises both searching 310 the ample image 104 and modifying 312 the ample image 104, by performing at least one of the following pairs of steps on the ample image in the management environment: handling 530 a virus by detecting a virus and then quarantining or repairing an infected file; handling 530 a virus by detecting a virus and then removing an infected file; handling 532 an illegal file by identifying 404 an illegal file and then removing that illegal file; enforcing 534 policy by identifying a breach of a policy that defines standardized storage locations for particular types of data and then moving or removing data to enforce that policy.

Figure 7:
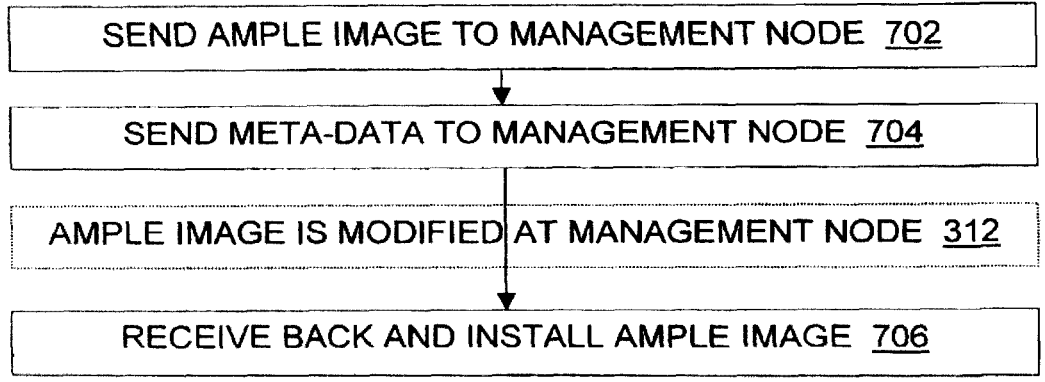
FIG. 7 is a flowchart illustrating a resource management method of the present invention from the perspective of a managed computer.

A modified ample image 312 may be viewed in claim terms as the product of a process. For instance, FIG. 3 is stated from the perspective of the management computer, but as illustrated in FIG. 7 the invention likewise provides a process that can be stated from the perspective of an imaged computer 102: send 702 an ample image 104 to a management node 110; send 704 meta-data to the management node 110; after both sending steps receive and install 706 a modified ample image on the computer 102. The modified ample image may differ from the image sent 702 to the management node 110 in one or more of the following ways: a change (installation, updating, patching, disabling, or removal) in application software; a change in driver software; a change in other software; a change in the partition table (e.g., new partition, partitions merged, partitions resized); a change in cluster size; a change in the folder in which given data is stored; a change in the partition in which data is stored; a change in status (e.g., quarantined or not, repaired or not, removed or not) of a file infected by a virus; a change in status (removed or not) in an illegal file.

Figure 6:
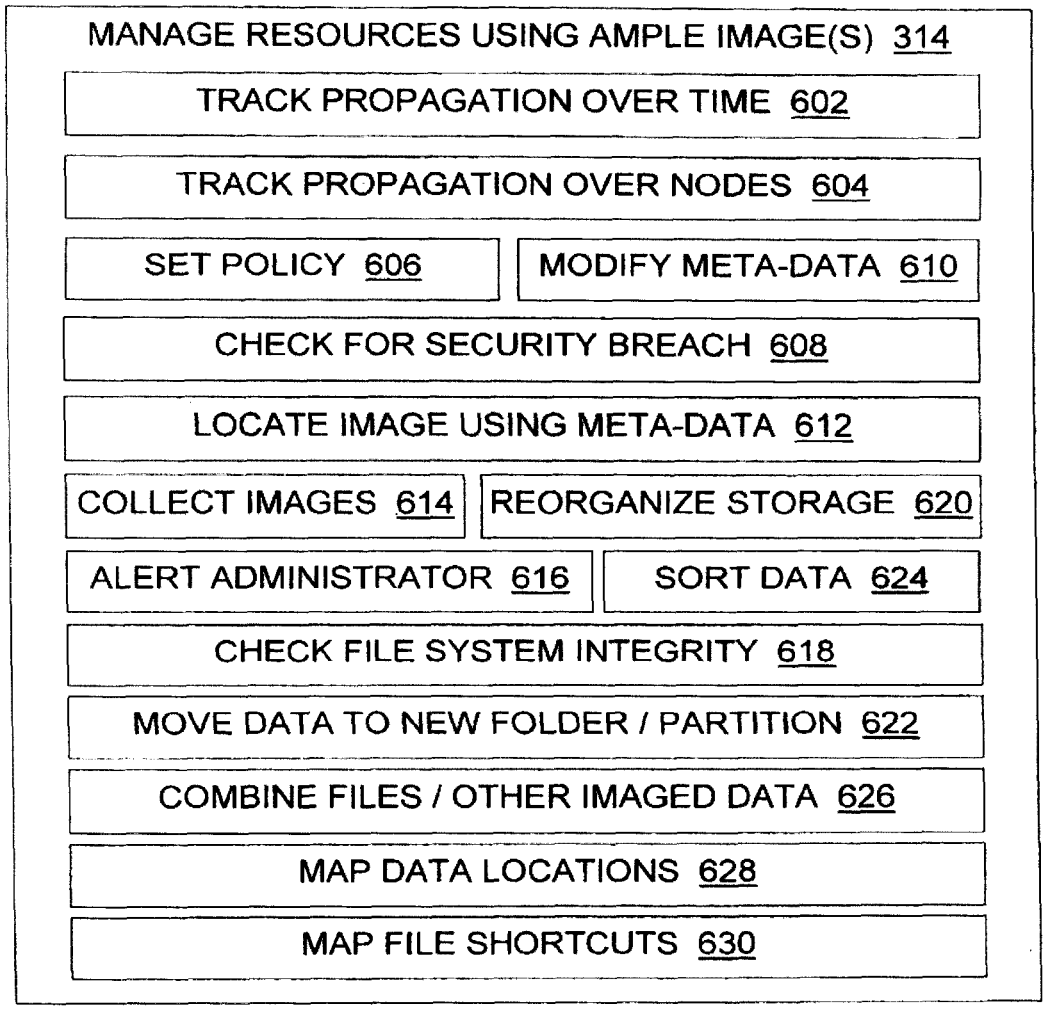
FIG. 6 is a flowchart further illustrating resource management steps of the present invention.

FIG. 6 further illustrates steps which may serve as resource management facilitating steps 314 in the management environment 138 of a given embodiment and/or in a given situation. The steps are illustrative only, not necessarily comprehensive or required, and may overlap. Groups of images 104 can be tracked, or used in tracking files. In one tracking step 602, multiple ample images 104 are searched to track propagation of a file, an infection, or another storage characteristic over time; the ample images used for this step 602 are imaged from a particular computer 102 at different points in time. For example, one could track 602 propagation of a virus through the files on a computer 102 to identify a virus' point of entry, to gain a better understanding of how the virus operates, and/or to determine which files may have been infected.

In another tracking step 604, multiple ample images 104 are searched to track propagation of a file, an infection, or another storage characteristic over nodes in a network, that is, over different computing devices attached to the network. In this case, the ample images used are imaged from multiple computers 102, and may also be imaged at different points in time. One could track 604 a virus across the network 106. One could also track 604 an illegal file, such as an MP3 file or a file containing highly confidential information, across the network 106 to identify users who have insecure machines 102, for example, or users who might be involved in unauthorized activities.

Other management steps 314 are discussed elsewhere, and shown in FIG. 6 as a reminder. For instance, during a policy setting step 606, an administrator sets a policy, such as a policy of the type recognized in conventional SRM software, to be enforced 534 by appropriate modifications 312 of ample images 104 followed by deployment 316 of the modified images.

Also, if modification 312 of an image 104 makes the meta-data 128 associated with the image inaccurate, then the meta-data may be modified 610 to match the modified image. For example, if a hardware driver is installed 508, then the meta-data 144 describing the hardware 116 on the imaged computer may be modified 610 accordingly (regardless of whether the actual hardware has been swapped yet) so that the meta-data indexing 132, 218 operates to locate 612 the modified image 104 in the image database 222 when the hardware driver in question is specified as a key.

Some embodiments provide software similar to Power-Quest Drive Image® software, to build and write—in a recognized image file format—an image from the ample image 104 data in a management environment. The resulting collection of one or more image files can then be (re)deployed 316 using conventional image deployment software.

Configured Media Generally

The computers 102, 110 are capable of using floppy drives, tape drives, optical drives or other means to read a configured storage medium 146. A suitable configured medium includes a magnetic, optical, or other computer-readable storage device. Suitable storage devices include floppy disks, hard disks, tape, CD-ROMs, PROMs, RAM, and other computer system storage devices. The substrate configuration of the medium 146 represents data and instructions which cause the computer system to operate in a specific and predefined manner as described herein. For instance, the medium 146 tangibly embodies a program, functions, and/or instructions that are executable by the management computers 110 or imaged computers 102 to perform methods of the present invention substantially as described and claimed herein.

CONCLUSION

Using the present invention, one can take a picture or snapshot of up to the entire functioning storage space of a client computer. Indeed, all computers in an enterprise including all servers, desktops, laptops, and mobile data devices could be imaged. After the image(s) are copied or moved to an alternate storage location at a management computer, one can perform various resource management tasks using the alternate copies of the image. An ample image contains persistent data from the client. In a full ample image, this is data that represents the exact state of both the operating system and all installed software as well as all the system and user data contained on the client computer. This is the "active state" of a fully imaged computer. Using the captured active state, one can mine this data, as in an SRM application, to learn any storage-evident aspect of the current operation of the operating system and applications, as well as anything else captured in the stored data.

As a further step, one can then make modifications to this active state data and send it, back to the same client and/or to another client computer, by rebuilding an image, taking that image to the target(s), and then (re)writing each target's storage with the image. When sending the image back to different client than the one on which it originated, one should make necessary modifications in the environment and configuration data used by the operating system to allow it to properly recognize and accept this change in its active state. For instance, hardware differences may require device driver changes, and disk capacity changes may require resizing or splitting partitions, or deleting unwanted data. Changes can be made interactively and/or by scripts, and they may be constrained or triggered by administrator-defined policies.

Embodiments of the invention may allow less disruptive management of a real-time computing environments than other tools, may reduce the number of copies of management software needed per node, may allow storage management to be centralized around one controlled set of images and meta-data, may allow storage management applications to view the historical conditions of a user(s)/computer and its environment, and/or may allow for the protection of computer 102 data by permitting environments to be rolled back to a specific point in time and the associated environment.

Suitable software to assist in implementing the invention is readily provided by those of skill in the pertinent arts) using the teachings presented here and programming languages and tools such as C++, C, Java, Pascal, Perl, Python, XML, APIs, SDKs, assembly, firmware, microcode, and/or other languages and tools.

Although particular embodiments of the present invention are expressly illustrated and described herein, it will be appreciated that discussion of one type of embodiment also generally extends to other embodiment types. For instance, the description of the methods illustrated in FIG. 3 also helps describe systems like those shown in FIG. 1 which can operate according to those methods. Embodiments such as the methods or systems illustrated may omit items/steps, repeat items/steps, group them differently, supplement them with familiar items/steps, or otherwise comprise variations on the given examples. All claims as filed are part of the specification and thus help describe the invention, and repeated claim language may be inserted outside the claims as needed. Any failure to expressly identify a thing as prior art in this document is not an assertion that it is not prior art; readers are assumed to be familiar with the state of the art.

As used herein, terms such as "a" and "the" and designations such as "ample image" and "searching", are inclusive of one or more of the indicated item or step. In particular, in the claims a reference to an item generally means at least one such item is present and a reference to a step means at least one instance of the step is performed.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope to the full extent permitted by law.

What is claimed and desired to be secured by patent is:

1. A method of computer resource management, the method comprising:
   performing, in response to a predefined schedule, at least one resource-management task, the resource-management task comprising:
   receiving, at a management node that comprises at least one management computer, at least one ample image captured from an existing computer that is distinct from the management computer;
   obtaining, at the management node, meta-data that is structurally associated with the ample image, the meta-data comprising at least one of:
      information stored in at least one of hidden partitions and hidden files;
      information stored on sectors outside any defined partition;
      information stored inside file system structures and outside any user-defined file;
   indexing, at the management node, the ample image within a database that comprises a collection of a plurality of ample images such that the ample image can be located by using at least part of the meta-data as a database key;
   mounting the ample image at the management node;
   modifying at least a portion of the ample image at the management node by splitting the ample image into two or more split ample images such that functionality originally associated with the ample image is split between the two or more split ample images;
   upon splitting the ample image, deploying the two or more split ample images from the management node to two or more computers that are distinct from the management node.

2. The method of claim 1, wherein splitting the ample image comprises splitting a partition of the ample image.

3. The method of claim 1, wherein modifying at least a portion of the ample image further comprises performing at least one of the following steps on the ample image at the management node: installing an application, updating an application, removing an application, installing a hardware driver, updating a hardware driver, removing a hardware driver, installing system software other than a hardware driver, updating system software other than a hardware driver, and removing system software other than a hardware driver, wherein removing software comprises at least one of uninstalling, overwriting, disabling, and deleting the software and removing is directed specifically at the software rather than the entire image.

4. The method of claim 1, wherein modifying at least a portion of the ample image further comprises performing at least one of the following steps on the ample image at the management node: creating a partition, resizing a partition, resizing clusters of a partition, moving a partition, moving data between partitions, canonizing a partition, deleting a partition, merging two partitions, and manipulating a volume segment.

5. The method of claim 1, wherein modifying at least a portion of the ample image further comprises performing at least one of the following steps on the ample image at the management node: defragmenting files, reclaiming directory space in a partition, recovering data despite corrupted or lost file system information, and converting one file system type to another file system type.

6. The method of claim 1, wherein the method further comprises modifying the meta-data to reflect a modification of the ample image.

7. The method of claim 1, wherein the method further comprises searching the ample image and performing at least one of the following steps on the ample image at the management node: extracting disk usage information, determining whether a particular file is present, determining whether at least one file of a particular type is present, and determining billing for storage usage.

8. The method of claim 1, wherein modifying at least a portion of the ample image further comprises performing at least one of the following pairs of steps on the ample image at the management node: identifying an illegal file and then removing that illegal file and identifying a breach of a policy that defines standardized storage locations for particular types of data and then moving or removing data to enforce that policy.

9. The method of claim 1, wherein the method further comprises searching multiple ample images to track file propagation by at least one of: tracking propagation of a file over time using ample images of a particular existing computer that were created at different points in time and tracking propagation of a file over multiple computers using ample images of multiple existing computers.

10. The method of claim 1, wherein mounting the ample image comprises mounting the ample image into a file system that is running at the management node.

11. The method of claim 1, wherein receiving, at the management node, at least one ample image captured from the existing computer comprises receiving an image of an entire disk of the existing computer.

12. The method of claim 1, wherein indexing the ample image within the database that comprises the collection of the plurality of ample images such that the ample image can be located by using at least part of the meta-data as the database key comprises indexing by at least one of: a user name, a computer name, an image creation time, an IP address, a value identifying installed hardware, a value identifying installed operating system type, a value identifying an installed application, and a value given in a registry file of the existing computer.

13. The method of claim 1, wherein the predefined schedule comprises a script of batch-mode user commands.

14. The method of claim 1, wherein the predefined schedule comprises a policy specified on a computer-readable medium in a computer-parseable form.

15. A computer-readable storage medium configured to cause at least one management node computer to perform a method of computer resource management, the method comprising:
   performing, in response to a predefined schedule, at least one resource-management task, the resource-management task comprising:
   receiving, at a management node that comprises at least one management computer, at least one ample image captured from an existing computer that is distinct from the management computer;
   obtaining, at the management node, meta-data that is structurally associated with the ample image, the meta-data comprising at least one of:
      information stored in at least one of hidden partitions and hidden files;
      information stored on sectors outside any defined partition;
      information stored inside file system structures and outside any user-defined file;

indexing, at the management node, the ample image within a database that comprises a collection of a plurality of ample images such that the ample image can be located by using at least part of the meta-data as a database key;

modifying at least a portion of the ample image at the management node by splitting the ample image into two or more split ample images such that functionality originally associated with the ample image is split between the two or more split ample images;

upon splitting the ample image, deploying the two or more split ample images from the management node to two or more computers that are distinct from the management node.

16. The computer-readable storage medium of claim 15, wherein modifying at least a portion of the ample image further comprises performing at least one of the following steps on the ample image: modifying a partition table, resizing a partition, resizing clusters of a partition, moving data between partitions, canonizing a partition, deleting a partition, merging two partitions, manipulating a volume segment, defragmenting files, reclaiming directory space in a partition, recovering data despite corrupted or lost file system information, removing an illegal file, installing software, updating software, and removing software, wherein removing the software comprises at least one of uninstalling, overwriting, disabling, and deleting the software, and removing is directed specifically at that software rather than the entire image.

* * * * *

UNITED STATES PATENT AND TRADEMARK OFFICE
CERTIFICATE OF CORRECTION

| | | |
|---|---|---|
| PATENT NO. | : 9,182,969 B1 | |
| APPLICATION NO. | : 11/863939 | |
| DATED | : November 10, 2015 | |
| INVENTOR(S) | : Donald Kleinschnitz, Jr., Val A. Arbon and Roland D. Whatcott | |

It is certified that error appears in the above-identified patent and that said Letters Patent is hereby corrected as shown below:

Claims

Please correct the Letters Patent to include claims 35-38. They are missing from the Letters Patent. The claims are as follows:

Claim 35:
A method for managing computer resources, the method comprising:
　　receiving, at a management node that comprises at least one management computer, at least one ample image captured from an existing computer that is distinct from the management computer;
　　identifying, at the management node, meta-data associated with the ample image;
　　obtaining, at the management node, meta-data that is structurally associated with the ample image, the meta-data comprising at least one of:
　　　　information stored in at least one of hidden partitions and hidden files;
　　　　information stored on sectors outside any defined partition;
　　　　information stored inside file system structures and outside any user-defined file;
　　indexing, at the management node, the ample image within a database that comprises a collection of a plurality of ample images such that the ample image can be located by using at least part of the meta-data as a database key;
　　mounting the ample image at the management node;
　　modifying, at the management node, at least a portion of the ample image captured from the existing computer by splitting the ample image into two or more split ample images such that functionality originally associated with the ample image is split between the two or more split ample images;
　　upon splitting the ample image, deploying the two or more split ample images from the management node to two or more computers that are distinct from the management node.

Claim 36:
The method of claim 1, wherein modifying at least a portion of the ample image further comprises:
　　detecting a computer virus that has infected the ample image;

Signed and Sealed this
Twelfth Day of July, 2016

Michelle K. Lee
*Director of the United States Patent and Trademark Office* neutralizing the computer virus.

Claim 37:
The method of claim 1, wherein one of the two or more computers that are distinct from the management node comprises the existing computer from which the ample image was captured.

Claim 38:
The method of claim 1, wherein the meta-data comprises information stored in at least one of:
    hidden partitions;
    hidden files.